United States Patent [19]

Ferrier et al.

[11] Patent Number: 5,424,353

[45] Date of Patent: Jun. 13, 1995

[54] MOLDING MATERIAL CONTAINING REFRACTORY FIBERS, USABLE IN THE MANUFACTURE OF ABLATABLE PIECES, PROCESS FOR MANUFACTURING SAME AND APPLICATIONS THEREOF

[75] Inventors: Christiane Ferrier, Igny; Jean-Marie Vernotte, Vanves; Christian Romand, Chatillon, all of France

[73] Assignee: Aerospatiale Societe Nationale Industrielle, Paris Cedex, France

[21] Appl. No.: 983,427

[22] Filed: Dec. 2, 1992

[30] Foreign Application Priority Data

Dec. 5, 1991 [FR] France .................. 91 15078

[51] Int. Cl.⁶ .................. C08K 3/04; C08K 7/02
[52] U.S. Cl. .................. 524/496; 524/440; 524/443; 524/495; 524/594; 423/445 R
[58] Field of Search ........... 524/496, 440, 443, 594; 423/445

[56] References Cited

U.S. PATENT DOCUMENTS

| | | | |
|---|---|---|---|
| 3,969,124 | 7/1976 | Stewart | 524/496 |
| 4,058,403 | 11/1977 | Funabiki et al. | 524/27 |
| 4,216,020 | 8/1980 | Watanabe et al. | 501/99 |
| 4,282,288 | 8/1981 | Yoshino et al. | 524/496 |
| 4,435,538 | 3/1984 | Kostikov et al. | 524/492 |
| 4,507,165 | 3/1985 | Herring | 264/3.1 |
| 4,581,391 | 4/1986 | Baldwin | 524/789 |
| 4,751,134 | 6/1988 | Chenoweth et al. | 428/903 |
| 4,847,311 | 7/1989 | Yamaya et al. | 524/413 |
| 5,167,876 | 12/1992 | Lem et al. | 428/911 |

FOREIGN PATENT DOCUMENTS 0018506 11/1980 European Pat. Off. .
0267289 5/1988 European Pat. Off. .

*Primary Examiner*—Paul R. Michl
*Assistant Examiner*—Olga Asinovsky
*Attorney, Agent, or Firm*—Nikaido, Marmelstein, Murray & Oram

[57] ABSTRACT

The invention relates to a thermosetting molding material, containing refractory fibers, characterized in that it can be injection molded and takes the form of a "flock" of 60 to 30% by weight of solid fillers which include refractory fibers, impregnated with 40 to 70% by weight of thermosetting resin. This molding material is obtained from a syrup of the catalysed thermosetting resin into which are introduced the solid fillers while mixing in such a way as to produce homogeneous impregnation of the filler with the catalyzed resin, then the mixture is kneaded until the filler is converted into a flock whereupon the flock/resin mixture is dried under reduced pressure. Application to the manufacture, in particular by conventional injection molding, of composite materials usable in the manufacture of motors for tactical missiles, in particular ablatable blast pipes.

11 Claims, No Drawings

MOLDING MATERIAL CONTAINING REFRACTORY FIBERS, USABLE IN THE MANUFACTURE OF ABLATABLE PIECES, PROCESS FOR MANUFACTURING SAME AND APPLICATIONS THEREOF

The invention relates to a new type of molding material which can be molded using the means known to a man skilled in the art, in particular by injection molding, for the manufacture of composite materials usable, among other things, for tactical missiles, to a process for manufacturing same and to applications thereof.

Composite materials usable for motors of tactical missiles have to possess mechanical and thermal characteristics that are compatible with the application contemplated, in particular with the possibility of controlling their ablation when the thruster is in operation.

The materials of this type known hitherto, based on fillers, in particular on fibrous fillers such as cotton, glass, mica and thermosetting resins such as phenolic resins or polyesters, are either molded by compression alone or are compression-transfer molded. Such manufacturing methods have drawbacks particularly insofar as they necessitate molding cycles that are long, and thus incompatible with mass production. In addition, the distribution of the fillers, particular fibers, is completely random, and it is therefore impossible to control the ablation of the materials in question at the time they are used, in particular in a thruster.

The object of the invention is to remedy the aforementioned drawbacks by providing a molding material capable of being injection molded, for the manufacture of composite materials usable, in particular, in motors for tactical missiles, in particular powder propelled motors, with the possibility of ensuring ablation during operation that does not generate deep flaws on the surface concerned.

This object is achieved according to the invention which, according to one of its aspects, provides a thermosetting molding material, containing refractory fibers, characterized in that it can be injection molded and takes the form of a "flock" essentially constituted by 60 to 30% by weight of solid fillers, impregnated with 40 to 70% by weight of thermosetting resin.

The term "flock" is to be taken here as meaning an assembly of fibrils in the form of a wad.

The solid fillers are essentially composed of refractory fibers such as fibers of carbon, graphite, silicon carbide, silica or aramide resin such as that marketed under the trade name of Kevlar ® by the Du Pont company, carbon and silicon carbide fibers being preferred.

In this molding material, the fibers advantageously have lengths of between a few microns ($\mu$m) and a few millimeters (mm), in particular lengths of 5 $\mu$m to 6 mm.

It is advantageous, however, for a part of the solid fillers to be composed of a powder chosen, in particular, from carbon blacks or graphites.

The presence of powder in the solid fillers is particularly advantageous insofar as, among other advantages, it promotes the flow of the material in the screw at the time of injection molding.

The thermosetting resin of this molding material can be chosen, in particular, from those resins that yield, upon pyrolysis, a high proportion of coke, such as, for example, polystyryl-pyridines (PSP), polyimide resins and phenolic resins.

However, resins of the phenolic type, such as those known by the name of novolak, seem to be particularly appropriate for the manufacture of the molding material according to the invention.

According to another aspect, the invention provides a process for manufacturing the molding material, in the form of a flock, defined hereabove.

More precisely, the invention also relates to a process for manufacturing the thermosetting molding material defined hereabove, characterized in that it essentially comprises the steps consisting in:

1° preparing a syrup of catalyzed thermosetting resin, having a viscosity enabling the impregnation of the fillers to be optimized;
2° introducing the solid fillers into this syrup, in the requisite proportions, while mixing to ensure that the fillers are homogeneously impregnated;
3° kneading the mixture until a flock is obtained; and
4° drying the flock obtained under reduced pressure.

The catalyzed resin syrup can be manufactured on demand, that is to say at the time of manufacturing the molding material, or prepared in advance and stored in a cold room prior to use, the period within which the molding material may be used without being damaged running from the date on which the resin is brought into contact with its catalyst.

The choice of catalyst depends on the resin used. Thus, in the case of a novolak type phenolic resin, hexamethylene-tetramine is used, in particular, as a catalyst.

The choice of solvent depends basically on the type of resin used. Thus, in the case of a novolak type phenolic resin, the solvent used can advantageously be 95° denatured alcohol, or acetone.

The viscosity of the syrup is adjusted, using the solvent, so as to permit optimum impregnation of the fibers. By way of example, in the event of using a novolak type phenolic resin and fillers composed of graphite in powder form and carbon fibers, the viscosity of the syrup is advantageously adjusted to a value of between 500 and 700 MPa.s.

During kneading, the length of the fibers is adjusted to the range defined hereabove.

The flock obtained is advantageously dried at a pressure not exceeding 2666 Pa (20 mm Hg) and at a temperature of about 50° C., for a prolonged period, of about 36 hours.

The thermosetting molding material thus obtained, in the form of a flock, can be stored in a cold room, in a closed airtight bag. As indicated earlier, the period within which the resin has to be used runs from the date on which it is brought into contact with its catalyst.

This thermosetting molding material can be used to manufacture composite materials usable, in particular, in the manufacture of motors for tactical missiles, in particular powder propelled motors, as the ablation of these materials obeys a law of monotonic function, that is to say one that is regular over all of the abtatable surface, which ensures, in operation, an ablation that does not generate deep flaws on the surface concerned.

This material can be injection molded, and that is one of its fundamental advantages by comparison with the prior art materials usable in the aforementioned applications, but it can also be molded using the techniques usually practised in the case of thermosetting materials and, in particular, compression or compression-transfer molding, when this proves preferable.

The invention will be more readily understood from the description that follows, given by way of a non-limitative example.

EXAMPLE

To produce a carbon flock, novolak phenolic resin and its catalyst, hexamethylenetetramine, are very finely comminuted. After comminution, the whole is screened. Then begins the operation of preparing the impregnating syrup, for which the following ingredients have to be supplied in the proportions fixed, namely in parts by weight as follows :

| | |
|---|---|
| phenolic resin | 100 |
| hexamethylenetetramine | 10 |
| calcium stearate | 2 |
| 95° denatured alcohol | 66. |

After these products have been weighed:
the following are poured into a mixer :
* the phenolic resin
* the denatured alcohol,
the mixer is started up and mixing is carried out until the ingredients are completely dissolved,
the ingredients below are poured into the mixer in the following order :
* the hexamethylenetetramine
* the calcium stearate,
mixing is carried out for a minimum of 1 hour,
the viscosity of the syrup is adjusted between 500 MPa.s and 700 MPa.s.

After the impregnating syrup has been prepared, the flock manufacturing operation properly speaking commences.

The following ingredients have to be supplied in the proportions fixed, namely in parks my weight :

| | |
|---|---|
| resin syrup | 890 |
| graphite in powder form | 100 |
| 6 mm carbon fibers | 350. |

After these products have been weighed:
the following are poured into a kneader:
* the phenolic resin syrup
* the graphite in powder form,
mixing is carried out until a homogeneous product is obtained,
the carbon fibers are introduced to produce homogeneous impregnation,
the ingredients are kneaded for a minimum of hour 30 minutes,
the flock obtained is dried in a vacuum tank :

| | |
|---|---|
| temperature | T = 50° C. |
| pressure | P ≦ 2666 Pa (20 mm Hg) |
| duration | t ≈ 36 hours, | storage of the material in a closed airtight bag.

In injection molding, the molding parameters for this type of material are :

| | |
|---|---|
| temperature of screw | 75 to 80° C. |
| temperature of mold | 170 to 180° C. |
| curing time | 2 to 4 minutes |
| duration of cycle | 4 to 6 minutes |

| | |
|---|---|
| -continued | |
| injection pressure | 80 MPa (800 bar). |

The characteristics of the molded product obtained are :

| | |
|---|---|
| Density | 1430 kg/m$^3$ |
| Linear shrinkage* | 0.2-0.6% |
| Tensile strength | 35 MPa |
| Elongation at rupture | 0.3% |
| Flexural strength | 130 MPa |
| Linear expansion coefficient | $8.10^{-5}$/°C. |
| Specific heat | 1130 J/kg.°C. |
| Thermal conductivity | 0.7 W/m.°C. |
| E modulus | 15 GPa |

*This value is given by way of information only : it depends on the type and conditions of molding, the shape of the piece, the orientation of the fibers, etc. It has to be determined for each type of piece, by comparison with the dimensions of the mold and of the piece molded.

In a powder propelled motor type application, the distribution and nature of the fillers of this type of material, thus obtained and molded, offer a possibility of controlling the ablation of the said material during operation, the said ablation being regular.

Among potential applications, mention can be made, among others, of the manufacture of ablatable blast pipes. With a powder having a temperature of 2600° K., the ablation of a blast pipe neck manufactured using the said material and having a nominal diameter of 23.3 mm, is 0.8 mm per second on the diameter.

We claim:

1. A process for manufacturing a molding material comprising the steps of:
   1° preparing a syrup, comprising a material capable of being converted into a thermosetting resin and catalyst for said conversion, which syrup has a viscosity sufficient to enable its impregnation into a mass of solid filler comprising refractory fibers;
   2° admixing 30 to 60% by weight of the mass of solid filler with 40 to 70% by weight of said syrup, under conditions sufficient to ensure that said mass of solid filler is homogeneously impregnated, to form a mixture;
   3° kneading the mixture until an impregnated floc comprising said impregnated filler is obtained; and
   4° drying the floc so obtained under reduced pressure;
   whereby forming a dried floc suitable for use as a molding material.

2. The process according to claim 1, wherein the syrup comprising catalyzed thermosetting resin is manufactured at the time of manufacturing the molding material or prepared in advance and stored in a cold room.

3. The process according to claim 1, wherein the thermosetting resin is a novolak phenolic resins and said catalyst is hexamethylene-tetramine.

4. The process according to claim 3, wherein said syrup additionally contains a solvent comprising 95° denatured alcohol, or acetone in an amount sufficient to cause the viscosity thereof to be about 500 to 700 MPa.s.

5. The process according to claim 3, wherein the filler comprises powder graphite and carbon fibers.

6. The process according to claim 1, wherein the kneading is continued for a duration sufficient to reduce the average length of the refractory fibers to about 5 μm to 6mm.

7. The process according to claim 1, wherein drying is carried out at a pressure not exceeding 2666 Pa (20 mm Hg) absolute and at a temperature of approximately 50° C., for a duration of approximately 36 hours.

8. A process for manufacturing ablatable parts of motors for tactical missiles, which comprises injection molding a floc, consisting essentially of 30 to 60% by weight of a mass of solid filler, comprising refractory fibers, and 40 to 70% by weight of a thermosetting resin impregnated in said mass, into said ablatable parts.

9. The process according to claim 8, wherein said parts of motors for tactical missiles are ablatable blast pipe necks.

10. A process as claimed in claim 1 further comprising injection molding said floc into a shaped article.

11. A process as claimed in claim 10 wherein said shaped article is ablatable.

* * * * *